United States Patent [19]

Yano et al.

[11] Patent Number: 4,865,632
[45] Date of Patent: Sep. 12, 1989

[54] INTEGRATED SEPARATOR FOR SOLID AND GASEOUS CONTAMINANTS IN A FLUID

[75] Inventors: Hisashi Yano; Hiroyuki Ihara; Junsuke Yabumoto, all of Kanagawa, Japan

[73] Assignee: Mitsubishi Oil Co., Ltd., Tokyo, Japan

[21] Appl. No.: 253,908

[22] Filed: Oct. 6, 1988

Related U.S. Application Data

[63] Continuation-in-part of Ser. No. 223,047, Jul. 22, 1988.

[30] Foreign Application Priority Data

Jul. 30, 1987 [JP] Japan ................................. 62-188976
May 17, 1988 [JP] Japan ................................. 63-118180
Aug. 16, 1988 [JP] Japan ................................. 63-202682

[51] Int. Cl.⁴ ........................................... B01D 19/00
[52] U.S. Cl. ........................................ 55/204; 55/267; 55/337; 210/168; 210/188; 210/416.5; 210/512.1

[58] Field of Search .................. 55/204, 267, 337; 210/167, 168, 188, 436, 416.5, 512.1

[56] References Cited

U.S. PATENT DOCUMENTS 3,845,840 11/1974 Thrasher ........................... 55/337 X
3,898,068 8/1975 McNeil ............................. 55/337 X Primary Examiner—Charles Hart
Attorney, Agent, or Firm—Sughrue, Mion, Zinn, Macpeak & Seas

[57] ABSTRACT

An integrated and compact separator for removing both solid and gaseous contaminants from fluid. Fluid to be cleaned is introduced tangentially into a vortex flow chamber before or after filtration of the fluid. The fluid stripped of gaseous contaminants passes through pores in the outer wall of the vortex flow chamber while gas-rich fluid collected near the center of the chamber passes into a gas removal pipe extending in the chamber at its axial center. After solid and gaseous contaminants are removed by the separator, the fluid flows out of the separator.

7 Claims, 2 Drawing Sheets

INTEGRATED SEPARATOR FOR SOLID AND GASEOUS CONTAMINANTS IN A FLUID

This is a continuation-in-part of application Ser. No. 07/223,047 filed July 22, 1988.

BACKGROUND OF THE INVENTION

In industrial applications requiring the handling fluids such as water, lubricants, chemical solutions, liquid foodstuffs and so forth, often it is necessary to remove solid contaminants from the fluid. For this purpose, it has been common practice to employ a fiber filter or a centrifugal filter.

On the other hand, in order to prevent rust from forming and to prevent annoying noise in industrial water use, to prevent oil starvation in lubrication systems, to prevent inefficiency and inaccuracy in hydraulic systems and nonuniform quality in chemical or foodstuff materials, conventionally, devices employing buoyancy, vacuum and centrifugal force have been employed for removing gaseous contaminants, examples of which are disclosed in U.S. Pat. No. 4,548,622.

No compact and integrated device has heretofore been known, however, which is capable of simultaneously removing both solid and gaseous contaminants in a fluid.

Such a device is particularly desirable though in the engine manufacturing industry. Moreover, as the rotational speed and output of automobile and motorcycle engines have lately been increased, the importance of removing gaseous as well as solid contaminants has increased. Excess gaseous contaminants in engine oil can cause serious difficulties, such as excess wear of lubricated parts due to oil starvation and a deterioration of the efficiency of the hydraulic valve lifters.

On the other hand, the space available inside the engine compartment is generally not sufficient to accommodate both an oil filter and a gas separator. Hence, an integrated separator is desired, both from a standpoint of space and in terms of weight.

SUMMARY OF THE INVENTION

Accordingly, an object of the present invention is to provide a compact and integrated separator for removing both solid and gaseous contaminants from fluids, for example, from engine oil.

In accordance with the above and other objects, the invention provides a compact and integrated separator for removing both solid and gaseous contaminants from fluids, for example, from engine oil in which a vortex flow chamber for gas removal is combined with an oil filter for solid filtration.

More specifically, the invention provides a separator device for removing both solid and gaseous contaminants from fluids including a filter system and a wall defining a vortex flow chamber which has a plurality of pores formed in the wall to permit fluids stripped of gaseous contaminants to pass therethrough. A fluid introduction pipe introduces fluids into the vortex flow chamber in a tangential direction of the chamber before or after the filter system passes the fluids. The wall defining the vortex flow chamber has a plurality of pores for passing fluids. A gas removal pipe extending into the vortex flow chamber and disposed substantially at the axial center of the vortex flow chamber has a plurality of small pores formed therein for allowing gas-rich fluids to pass therethrough. An outlet passage passes fluids which have passed through the filter and vortex flow chamber system.

BRIEF DESCRIPTION OF THE DRAWINGS

FIG. 1b shows a cross section of the separator of FIG. 1a taken along a line X-Y in FIG. 1a;

DESCRIPTION OF THE PREFERRED EMBODIMENTS

Referring to the accompanying drawings, preferred embodiments of the present invention will be described in detail.

Figure 1A:
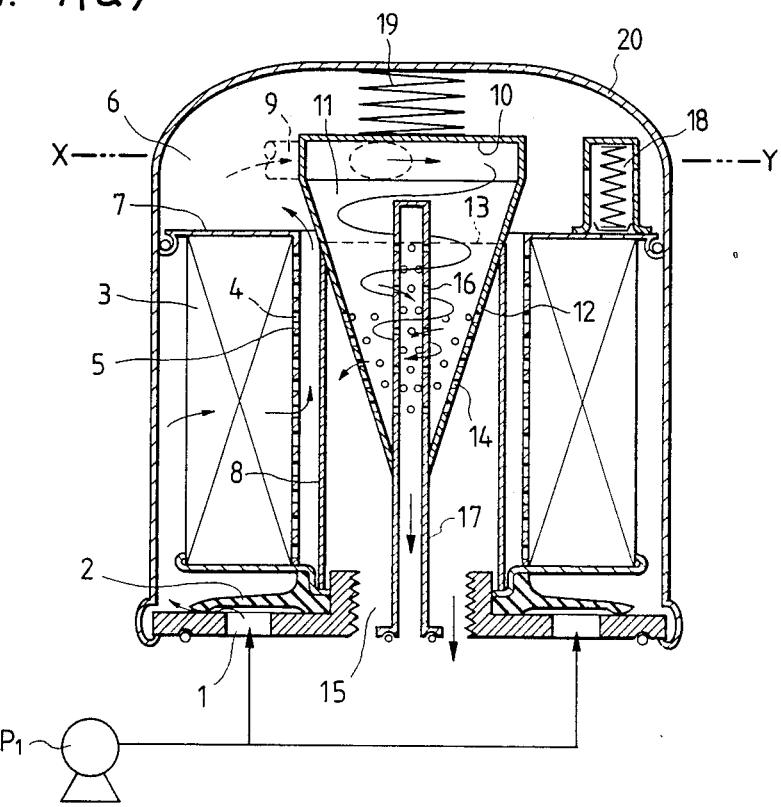
FIG. 1a is a cross-sectional view of an integrated separator constructed according to the present invention.

FIG. 1a shows a cross-sectional view of a separator for a four-cycle internal combustion engine, which separator is constructed in accordance with the present invention.

An oil pump $P_1$ pumps out oil containing solid and gaseous contaminants to the separator. The oil flow is introduced into the outside of the filter element 3 of the filter system through inlet holes 1 and a rubber check valve 2. The oil is filtered by the filter element 3 then flows out through many holes 4 formed in the cylindrical wall 5 of the filter system. The -filtered oil then flows to an upper chamber 6 separated by an upper wall 7 of the filter system through the space formed between the cylindrical wall 5 of the filter system and an inner cylindrical wall 8 located inside the filter system. The oil flows into an inlet pipe 9 disposed tangentially near the bottom (in the flow direction) 10 of the vortex flow chamber 11. The conical wall 12 of the vortex flow chamber 11 is fixed at the edge 13 of the inner cylindrical wall 8. A portion of the oil flowing in a vortex pattern inside the conical wall 12 flows out through the pores 14 formed in the conical wall 12 at the part lower than the fixed edge 13, and the oil flows out of the device through the outlet pore 15.

Due to the vortical flow of the oil in the vortex flow chamber 11 and the resulting centrifugal force acting on the oil, oil containing gaseous contaminants collects near the axial center of the flow. The gas-rich oil moves radially inwardly through small pores 16 formed in a gas removal pipe 17 provided near the axial center of the vortex flow chamber 11. The gas removal pipe 17 passes through the top wall of the conical vortex flow chamber 11.

A relief valve 18 is disposed on the upper wall 7 of the filter system. A spring 19 is placed between the outside bottom of the vortex flow chamber 11 and the wall 19.

Figure 1B:
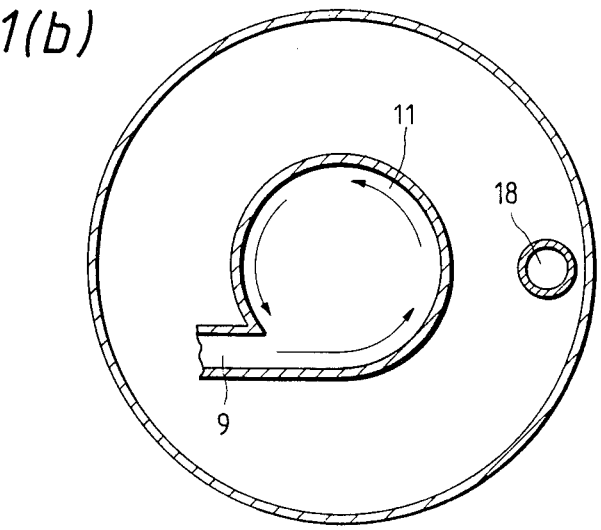

FIG. 1b shows a cross-sectional view of the separator of FIG. 1a taken along a line X-Y in FIG. 1a, specifically showing the region where the inlet pipe 9 extends tangentially into the vortex chamber 3.

Figure 2:
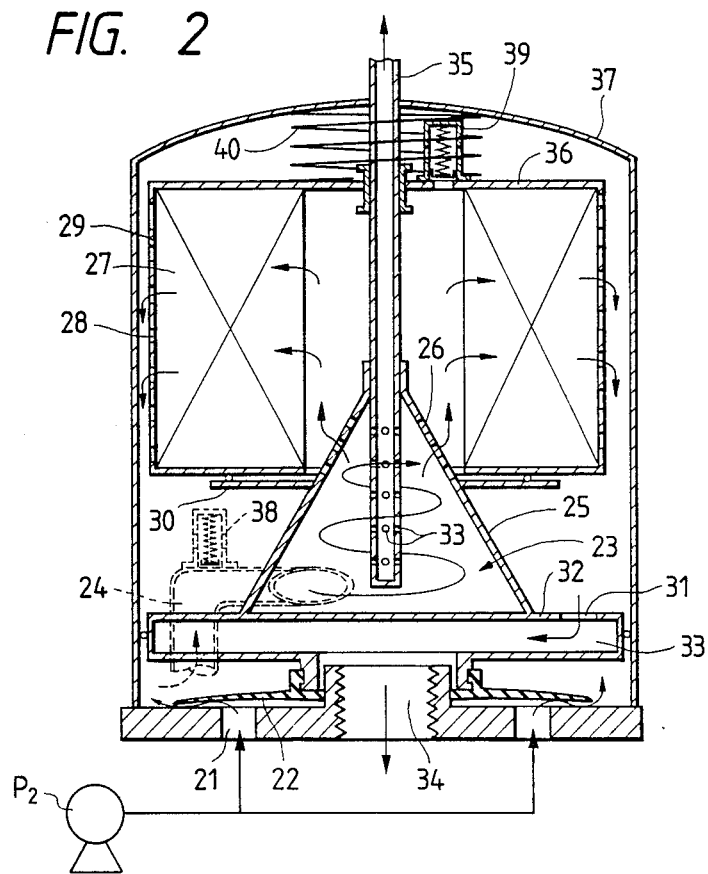
FIG. 2 is a cross-sectional view of another embodiment of an integrated separator of the invention.

FIG. 2 shows a second preferred embodiment of the invention, also intended for use with a four-cycle internal combustion engine.

An oil pump $P_2$ pumps out oil containing solid and gaseous contaminants to the separator through inlet holes 21 and a rubber check valve 22. The oil flow is introduced tangentially into a vortex flow chamber 23, of which shape is conical, through an inlet pipe 24. A portion of the oil flowing in a vortex pattern inside the conical wall 25 flows out through the pores 26 formed in the conical wall 25 into a filter system which is disposed around the upper part of the conical vortex flow chamber 23 and on an annular plate 30 fixed around the conical wall 25. The oil is filtered by a filter element 27 and passes through small pores 28 formed in the outer wall 29 of the filter system and then flows out through the intermediate holes 31 formed in the upper plate 32 under which comprises hollow space 33 to pass the oil through the outlet hole 34.

Due to the vortical flow of the oil in the vortex flow chamber 23 and the resulting centrifugal force acting on the oil, oil containing gaseous contaminants collects near the axial center of the flow. The gas-rich oil moves radially inwardly through small pores 33 formed in a gas removal pipe 35 provided near the axial center of the vortex flow chamber 23.

The gas removal pipe 35 passes through the top of the conical vortex flow chamber 23, the upper wall 36 of the filter system and the outer wall 37. Two relief valves 38 and 39 are disposed in the inlet pipe 24 and the upper wall 36. A spring 40 is placed between the upper outer wall 37 and the upper wall 36 of the filter system.

Figure 3:
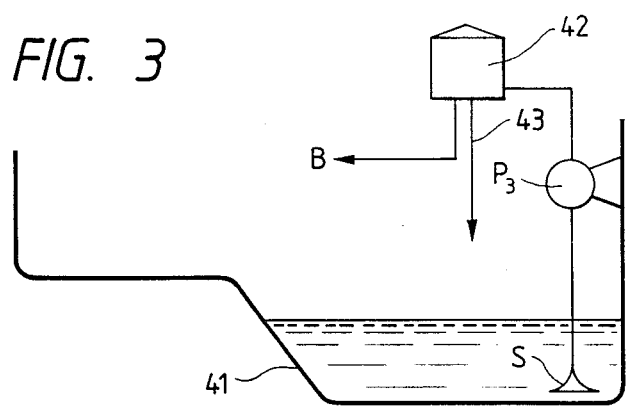
FIG. 3 is a schematic diagram of an engine lubricating system in which the present invention can advantageously be used.

FIG. 3 depicts schematically the connection of a separator device of the invention in a lubricating system of an engine.

Engine oil from an oil pan 41 is pumped by the oil pump $P_3$ through an oil screen S and supplied to a separator 42. Engine oil stripped of both solid and gaseous contaminants by the separator 42 is supplied to various parts B of an engine to be lubricated, and gas-rich oil is returned to the oil pan 41 through a gas removal pipe 43.

This completes the description of the preferred embodiments of the invention. Although preferred embodiments have been described, it is believed that numerous modifications and alterations thereto may be made without departing from the spirit and scope of the invention.

What is claimed is:

1. A separator device for removing both solid and gaseous contaminants from fluids, comprising: a wall defining a vortex flow chamber, a plurality of small pores being formed in said wall to permit fluids stripped of gaseous contaminants to pass therethrough; a fluid introduction means for introducing fluid into said vortex flow chamber in a tangential direction of said chamber; a fluid filter system disposed around the axial center of the separator; a gas removal pipe extending into said vortex flow chamber and disposed substantially at an axial center of said vortex flow chamber, a plurality of small pores being formed in said gas removal- pipe for allowing gas-rich fluid to pass therethrough; and fluid outlet passage means for passing fluid stripped of both solid and gaseous contaminants.

2. The separator device of claim 1, wherein said vortex flow chamber has a circular cross-sectional view in every cross-section taken at a right angle along a central axis of said vortex flow chamber.

3. The separator device of claim 1, wherein said filter system is disposed around said vortex flow chamber.

4. The separator device of claim 1, further comprising a relief valve provided in said introduction pipe.

5. The separator device of claim 1, further comprising a relief valve provided in said gas removal pipe.

6. The separator device of claim 1, further comprising a relief valve provided between the inlet and outlet sides of the filter systems.

7. The separator device of claim 1, further comprising means for fixing inner contents of said separator.

* * * * *